(12) United States Patent
Oosawa

(10) Patent No.: US 10,851,743 B2
(45) Date of Patent: Dec. 1, 2020

(54) INTAKE MANIFOLD

(71) Applicant: MIKUNI CORPORATION, Tokyo (JP)

(72) Inventor: Hirobumi Oosawa, Kanagawa (JP)

(73) Assignee: Mikuni Corporation, Tokyo (JP)

( * ) Notice: Subject to any disclaimer, the term of this patent is extended or adjusted under 35 U.S.C. 154(b) by 87 days.

(21) Appl. No.: 15/753,140

(22) PCT Filed: Aug. 17, 2016

(86) PCT No.: PCT/JP2016/074034
§ 371 (c)(1),
(2) Date: Feb. 15, 2018

(87) PCT Pub. No.: WO2017/033817
PCT Pub. Date: Mar. 2, 2017

(65) Prior Publication Data
US 2018/0252188 A1   Sep. 6, 2018

(30) Foreign Application Priority Data
Aug. 25, 2015  (JP) .................................. 2015-165969

(51) Int. Cl.
F02M 35/10   (2006.01)
F02M 35/104  (2006.01)
(Continued)

(52) U.S. Cl.
CPC ...... F02M 35/10275 (2013.01); F02M 35/10 (2013.01); F02M 35/104 (2013.01);
(Continued)

(58) Field of Classification Search
CPC ....... F02M 35/10275; F02M 35/10032; F02M 35/10144; F02M 35/104; F02M 35/10262
(Continued)

(56) References Cited

U.S. PATENT DOCUMENTS 5,709,187 A * 1/1998 Jaeger .............. F02M 35/10019
123/198 D
2001/0039908 A1 11/2001 Bilek et al.
2006/0000437 A1* 1/2006 Kito ................. F02M 35/10019
123/184.21

FOREIGN PATENT DOCUMENTS

DE     198 14 979 A1   10/1999
DE       19814979 A1 * 10/1999 .............. F02B 21/00
(Continued)

OTHER PUBLICATIONS

International Search Report and Written Opinion in International Application No. PCT/JP2016/074034, dated Oct. 18, 2016.
(Continued)

Primary Examiner — Lindsay M Low
Assistant Examiner — Omar Morales
(74) Attorney, Agent, or Firm — Venable LLP; Henry J. Daley; Miguel A. Lopez

(57) ABSTRACT

To provide a compact intake manifold which can easily and reliably hold the flame arrester (25) to the base member, the base member (21) having the flame arrester (25) incorporated therein has the recessed body portion (31) and the annular fitting holding portion (32) for fitting the flame arrester (25) in the axial direction. The fitting holding portion (32) includes an abutment surface (32a) and a fitting inner wall peripheral surface (32b). The flame arrester (25) includes a flame suppressing structure (26), an outer cylinder body (27) surrounding the flame suppression structure (26), and an elastic holder member (51) which covers the outer peripheral surface and both end faces of the outer cylindrical body (27). The elastic holder member (51) has an outer peripheral fitting portion (52) fitted to the fitting holding portion (32) while being held in close contact with the outer cylindrical body (27).

3 Claims, 10 Drawing Sheets

(51) Int. Cl.
 *F02M 35/112* (2006.01)
 *F02M 35/16* (2006.01)
(52) U.S. Cl.
 CPC *F02M 35/10032* (2013.01); *F02M 35/10144* (2013.01); *F02M 35/10262* (2013.01); *F02M 35/10321* (2013.01); *F02M 35/112* (2013.01); F02M 35/1036 (2013.01); F02M 35/10347 (2013.01); F02M 35/167 (2013.01)
(58) Field of Classification Search
 USPC .................................................. 123/184.21
 See application file for complete search history.

(56) References Cited

FOREIGN PATENT DOCUMENTS

| | | |
|---|---|---|
| EP | 1 854 990 A1 | 11/2007 |
| EP | 2130567 A1 | 12/2009 |
| JP | 2006-46069 A | 2/2006 |
| JP | 2015-59431 A | 3/2015 |
| WO | 2014/044371 A2 | 3/2014 |

OTHER PUBLICATIONS

Supplementary European Search Report from corresponding European Application No. 16839164.7, dated Jan. 21, 2019.

\* cited by examiner

US 10,851,743 B2

INTAKE MANIFOLD

CROSS REFERENCE TO RELATED APPLICATIONS

This application is a U.S. National Stage Application under 35 U.S.C. § 371 of PCT/JP2016/074034, filed on Aug. 17, 2016, the entire content of which is hereby incorporated by reference, and claims the benefit of Japanese Patent Application No. 2015-165969, filed Aug. 25, 2015.

BACKGROUND OF THE INVENTION

Field of the Invention

The present invention relates to an intake manifold disposed in an internal combustion engine, and more particularly to an intake manifold having a flame damper incorporated in an intake passage.

Description of the Related Art

Conventionally, a manifold structure is realized by a small number of resin members to form an intake manifold disposed in an internal combustion engine mounted on a PWC (Personal Water Craft) such as a water motorbike, an outboard motor, and the like, and incorporating a flame damper (flame arrester) with a flame suppression structure disposed in the intake passage of the engine on the downstream side of the throttle body, thereby to enhance the function for preventing flashback from the combustion chamber side.

An intake manifold in which a flame damper is fitted in order to be able to abut against an annular fitting holding portion disposed in the base member in the axial direction among the base member and the cover member facing each other in the radical direction of an intake passage, and the flame damper is pressed in the retaining direction with respect to the fitting holding portion by an annular pressing portion provided on the cover member is known as an example of this kind of intake manifold (see, for example, Patent Document 1).

Further, an intake manifolds in which a fitting recessed portion in which a flame damper may be fitted in the radial direction is provided in the base member, and a band-shaped flame damper fixing member is brought into contact with the outer peripheral surface of the flame damper which is exposed on the base member, so as to suppress rattling of the flame damper in the radial direction with respect to the base member by welding the cover member from the outside to the base member is known (see, for example, Patent Document 2).

CITATION LIST

Patent Literature

[Patent Document 1] Japanese Unexamined Patent Application Publication No. 2006-46069
[Patent Document 2] Japanese Unexamined Patent Application Publication No. 2015-59431

SUMMARY OF THE INVENTION

Technical Problem

However, in the former conventional intake manifolds, the flame damper is fitted to be able to abut against the annular fitting holding portion of the base member in the axial direction, thereby to have the flame damper held by the annular fitting holding portion of the base member. In such conventional intake manifolds, it is difficult to fit the flame damper to a fixed position in the fitting holding portion of the base member and at the same time to have the flame damper reliably fitted to and held by the fitting holding portion of the base member.

In other words, there is a problem that it is not easy to satisfy both of workability of installing the flame damper in the base member and reliability of fitting and holding the flame damper by the base member.

On the other hand, in the latter conventional intake manifolds, the flame damper fixing member, which is an additional parts, is used to suppress a rattle in the radial direction of the flame damper. Such conventional intake manifolds are so constructed that the flame damper having a larger specific gravity than the resin members is held at the welding joint portion, so that the welding joint strength of the base member and the cover member is not sufficient. Further, since the fitting depth of the flame damper into the base member in the radial direction is shallow, the strength of fitting is likely to vary, thereby making the welding joint strength insufficient. For this reason, the welding joint portion of the base member and the cover member has to be made wider, thereby making it difficult to make the intake manifold compact.

It is the object of the present invention which was made to solve the above problems, to provide an easily compactable intake manifold which makes it possible to easily fit the flame damper to a fixed position in the fitting holding portion of the base member while reliably fitting and holing the flame damper to the fitting holding portion.

Means to Solve the Problem

In order to accomplish the above object, the intake manifold according to the present invention comprises: a base member and a cover member, respectively made of resin and extending along an intake passage, the base member and the cover member facing each other in the radical direction of the intake passage; and a flame damper having a flame suppression structure, the flame damper incorporated in a one end side portion of the base member so as to be positioned on the intake passage, wherein the one end side of the base member includes a recessed body portion having a substantially split cylindrical shape and a fitting holding portion integrally formed with the recessed body portion to hold the flame damper by fitting the flame damper in the axial direction so as to be able to abut against the fitting holding portion, the fitting holding portion includes an abutment surface against which the flame damper is able to abut from the side of the recessed body portion, and a fitting inner peripheral wall surface that surrounds and fits the flame damper therein, the flame damper is constituted by the flame suppression structure, an outer cylindrical body that surrounds the outer periphery of the flame suppression structure and an elastic holder member that covers an outer peripheral surface and both end surfaces of the outer cylindrical body, the elastic holder member includes an outer peripheral fitting portion held in close contact with the outer peripheral surface of the outer cylindrical body and fitted to the fitting holding portion, and the outer peripheral fitting portion includes a cylindrical wall portion held in close contact with the outer peripheral surface of the outer cylindrical body, and a plurality of annular lip portions respectively protruding from an outer peripheral surface of the cylindrical wall portion to the outside in the radial direction and one side in the axial direction of the cylindrical wall portion while being spaced apart from each other in the axial direction.

The intake manifold of the present invention may be so constructed that, the elastic holder member has an abutment portion on one side and an abutment portion on the other side integrally provided with the outer peripheral fitting portion, the abutment portion on one side surrounding an opening on an end side of the flame suppression structure while abutting and engaging with the abutment surface having an annular plate-shape of the fitting holding portion, and the abutment portion on the other side surrounding an opening on the other side of the flame suppression structure while being pressed in a retaining direction by at least one of the base member and the cover member.

In addition, the intake manifold of the present invention may be so constructed that, the plurality of annular lip portions are set such that an inclination angle of an outer peripheral surface side with respect to the center axis line of the cylindrical wall portion is smaller than the inclination angle of an inner peripheral surface side.

Further, the intake manifold of the present invention may be so constructed that, a cylindrical retaining rectifying member, which is interposed among the flame damper held by the fitting holding portion and the base member and the cover member, retains the flame damper with respect to the fitting holding portion and has an inner peripheral surface that continues without a step from an opening portion on the downstream side of the flame suppression structure to the inner wall surface of the base member and the cover member.

Effect of the Invention

According to the present invention, it is possible to provide an easily compactable intake manifold which makes it possible to easily fit the flame damper to a fixed position in the fitting holding portion of the base member while reliably fitting and holing the flame damper to the fitting holding portion.

DETAILED DESCRIPTION OF THE INVENTION

Hereinafter, embodiments for carrying out the present invention will be described with reference to the drawings.

FIGS. 1 to 9 show the intake manifold according to one embodiment. This intake manifold is disposed as a main part of an intake device in a three-cylinder internal combustion engine (hereinafter simply referred to as "engine") for PWC which slides on water.

Figure 2:
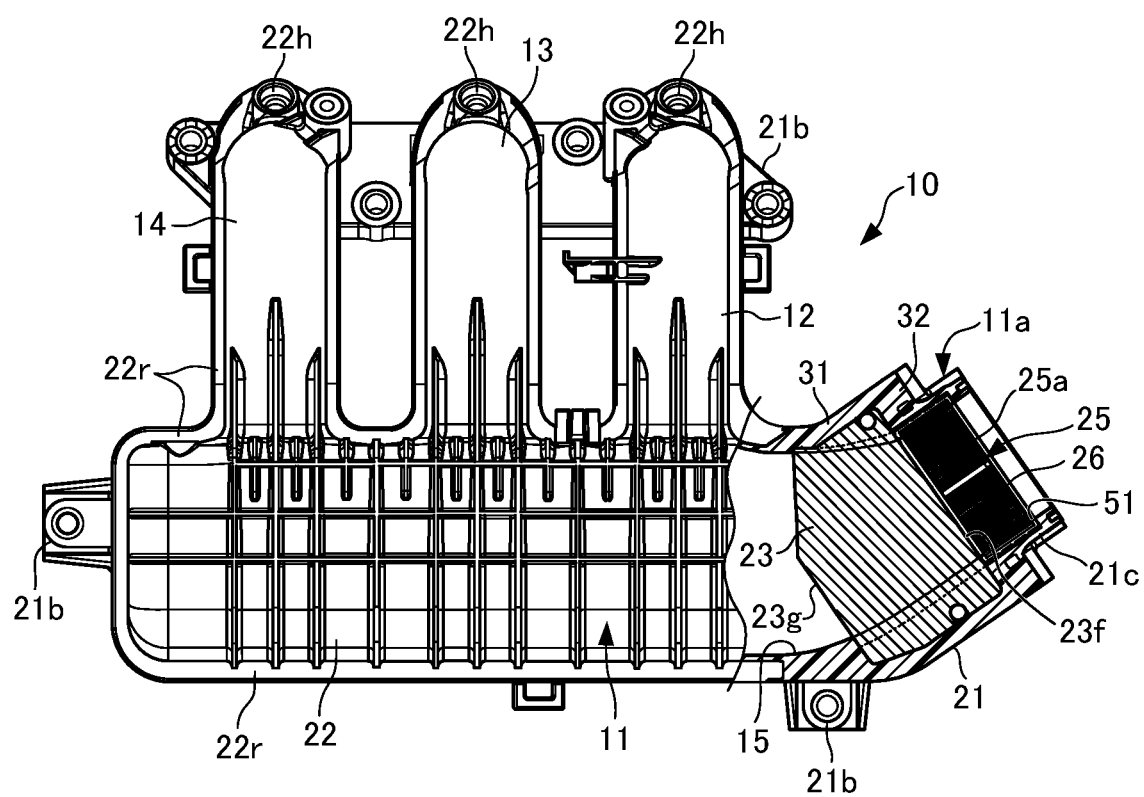
FIG. 2 is a plan view inclusive of a main part layout illustration of the intake manifold according to one embodiment of the present invention.

As shown in FIG. 2, the intake manifold 10 having a manifold shape includes a main pipe portion 11 having an open upstream portion 11*a*, and a plurality of branch pipes 12, 13, and 14 branched from the main pipe portion 11 to be connected to the three intake ports of the above-described engine. And, each of the plurality of branch pipe portions 12, 13, 14 has an intake passage 15 formed therein, so that intake air taken from an intake pipe (not shown) can be sucked into a plurality of cylinders of the engine.

The main pipe portion 11 has a shape that allows the main pipe portion 11 to function as a surge tank, and the plurality of branch pipe portions 12, 13, 14 are bifurcated substantially in the same direction from the main pipe portion 11 while branching substantially in parallel with respect to each other.

Figure 1:
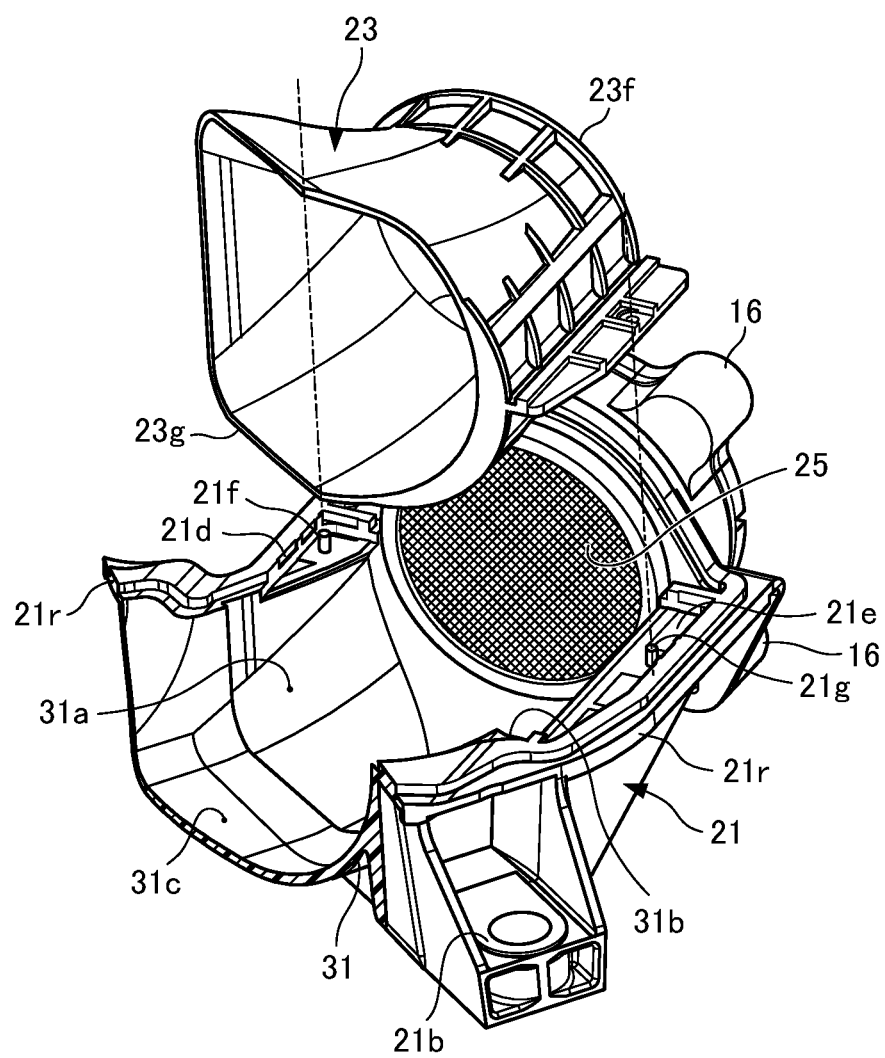
FIG. 1 is an exploded perspective view of essential parts of the intake manifold according to one embodiment of the present invention.
Figure 3:
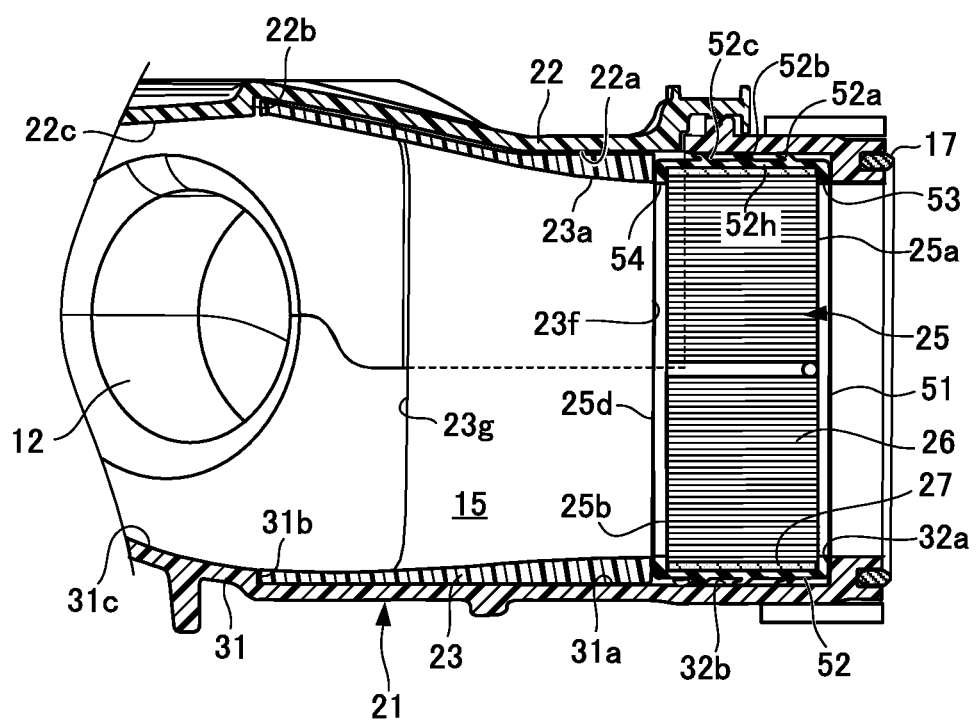
FIG. 3 is a longitudinal cross-sectional side view showing an upstream end side portion of an intake manifold according to an embodiment of the present invention viewed toward the intake branch pipe direction.
Figure 8:
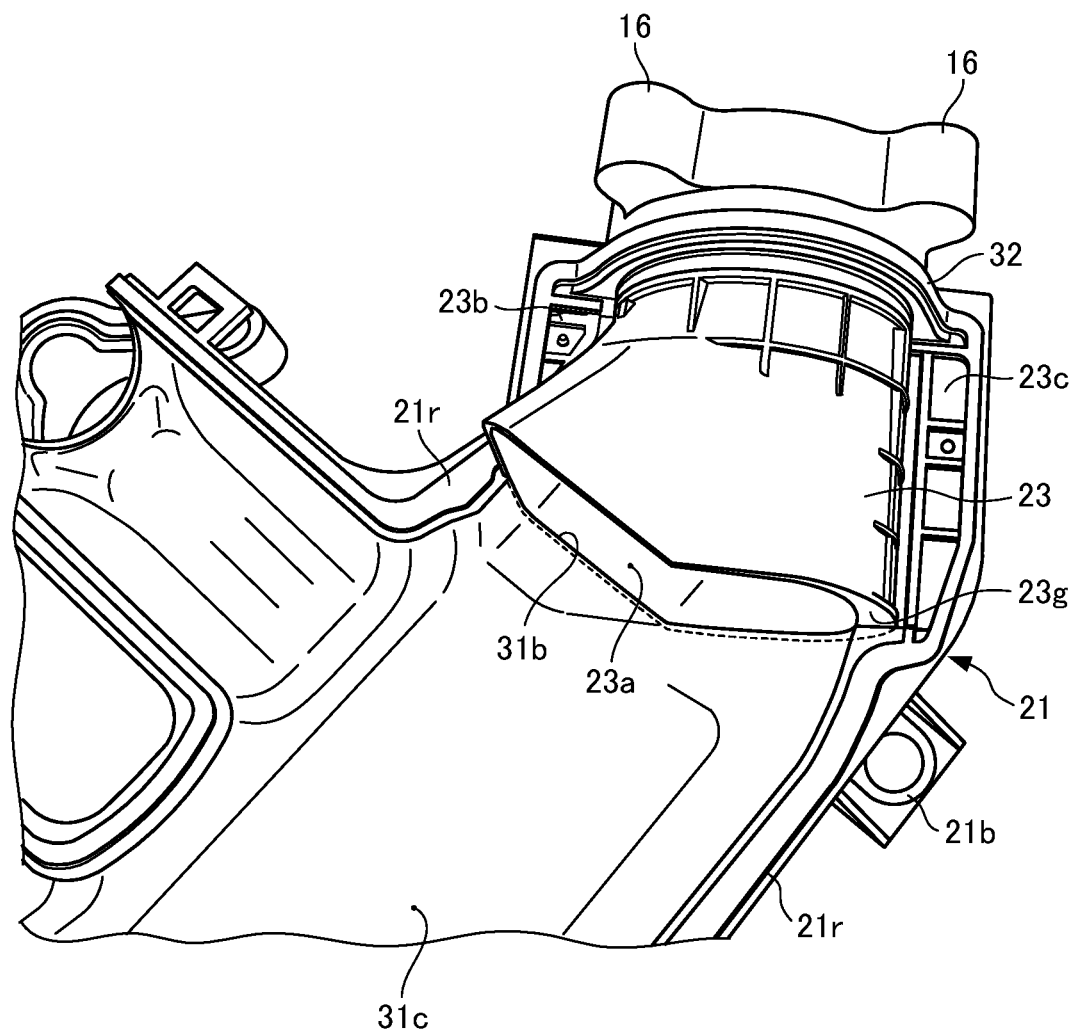
FIG. 8 is a main perspective view showing a state of the intake manifold according to an embodiment of the present invention, wherein the flame damper and the retaining rectifying member are assembled on the base member.

As shown in FIGS. 1 and 8, a plurality of bolt coupling portions 16 bolted to a throttle body (not shown) are provided on the upstream side portion 11*a* of the main pipe portion 11, and as shown in FIG. 3, a seal ring 17 for sealing the bolt coupling portions 16 is provided. Each of the plurality of bolt coupling portions 16 has a nut embedded therein by a method such as insert molding or the like.

The main pipe portion 11 and the branch pipe portions 12, 13, 14 are formed in a manifold shape by joining the resin-made recessed base member 21 and the resin-made cover member 22, which are extended along the intake passage 15 and facing radial direction of the intake passage 15, for example, by means of vibration welding or the like.

In addition, as shown in FIGS. 1-5, the base member 21 and the cover member 22 respectively have an inner wall surface shape of a substantially semicircular cross section and flange-like joint portions 21*r*, 22*r* extending outwardly from the respective side walls, throughout the region in most passage length formed by the main pipe portion 11 and the branch pipe portions 12, 13, 14. Further, the flange-like joint portions 21*r*, 22*r* are integrally welded and joined to each other at rib-like protruding portions in the widthwise center portions thereof.

As shown in FIGS. 1 and 2, the base member 21 is provided with a plurality of mounting bracket portions 21*b* for fastening bolts to the engine side member, and the cover member 22 has a plurality of injector attachment hole portions 22*h* formed therein.

In the vicinity of the upstream side end portion of the intake passage 15 inside the intake manifold 10 is provided a flame arrester 25 (flame damper) having a known flame suppressing structure incorporated therein.

As shown in FIGS. 1 to 4, the flame arrester 25 is constituted by a flame suppression structure 26, an outer cylindrical body 27 and an elastic holder member 51. The outer cylindrical body 27 is surrounding the outer peripheral of the flame suppression structure 26. The elastic holder member 51 is covering the outer peripheral surface and both end surfaces 27b, 27c of the outer cylindrical body 27. And the outer cylindrical body 27 is forming the outer peripheral surface 25e of the flame arrester 25.

The flame suppression structure 26 is a corrugated flame suppressing structure in which a thin stainless steel plate formed into a corrugated shape, for example, is wound and arranged in parallel to form a large number of narrow passageways in a honeycomb shape in the shape of a short cylinder, so that the flame suppression structure 26 is restrained to be in a short cylindrical form by the short cylindrical outer cylindrical body 27. This flame suppression structure 26 has a large number of narrow passageways which are small in intake resistance and small enough to block the passage of the flame to the upstream side. Each of the narrow passageways is formed by a metal surface cooled by heat exchange with the intake air.

Further, the flame arrester 25 is incorporated in the one end side portion 21c of the base member 21 positioned on the right end side of the intake manifold 10 in FIG. 2, and is held to be positioned on the intake passage 15.

As shown in FIGS. 1 to 5 and 8, the one end side portion 21c of the base member 21 includes a substantially split cylindrical recessed body portion 31 and an annular fitting holding portion 32 integrally formed with the recessed body portion 31. The recessed body portion 31 and the fitting holding portion 32 have an inner wall surface shape curved with a radius of curvature close to the radius of the flame arrester 25. The annular fitting holding portion 32 is arranged to have the flame arrester 25 held therein by fitting so as to be capable of abutting in the axial direction.

The upstream side portion 11a of the main pipe portion 11, forming a part of the intake passage 15, is formed in a predetermined section of the intake passage 15 adjacent to the downstream side of the flame arrester 25 and has an inner wall surface gently inclined with respect to the central axis line.

To be more specific, the fitting holding portion 32 has an annular plate-shaped abutment surface 32a and a short cylindrical fitting inner peripheral wall surface 32b. The abutment surface 32a allows the flame arrester 25 to be butted against in the axial direction around the opening on one end side 25a of the flame arrester 25. The fitting inner peripheral wall surface 32b is surrounding the outer periphery of the flame arrester 25, while having the flame arrester 25 fitted therein.

Figure 4:
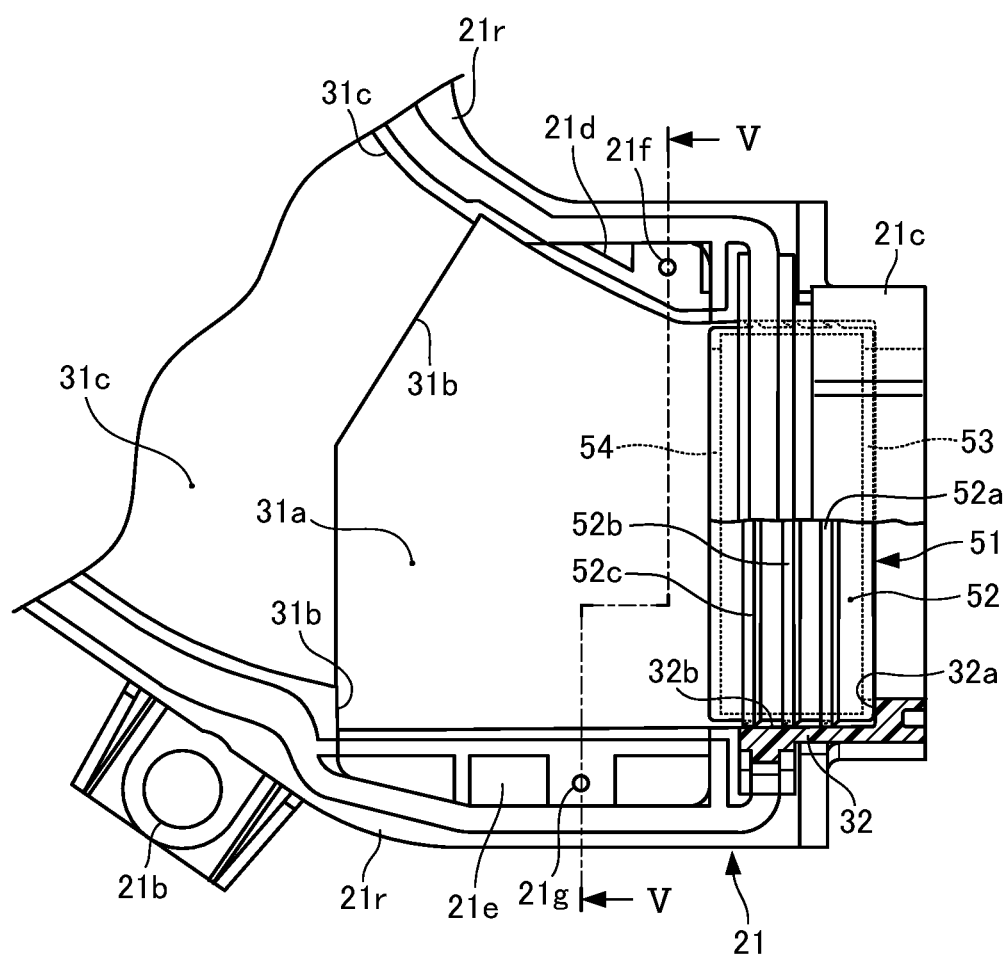
FIG. 4 is a partial enlarged plan view of the one end side portion the base member of the intake manifold according to one embodiment of the present invention.
Figure 5:
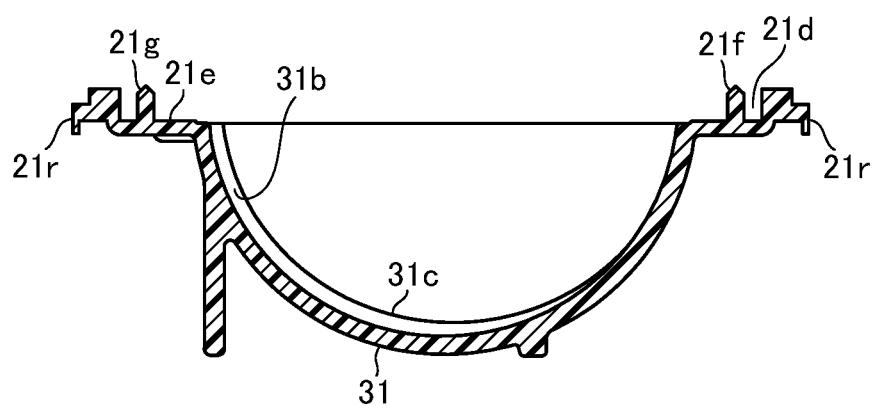
FIG. 5 is a cross-sectional view taken along the line V-V in FIG. 4.

As shown in FIGS. 3 to 5, the recessed body portion 31 has a first inner wall surface 31a of a semicircular cross-section continuing to about half of the fitting inner peripheral wall surface 32b of the fitting holding portion 32 and a second inner wall surface 31c of a semicircular cross section steppedly connected to the first inner wall surface 31a through an arcuate radial stepped surface 31b.

Between the flame arrester 25 held by the fitting holding portion 32 and the radial stepped surface 31b in the radial direction of the recessed body portion 31, a resin-made retaining rectifying member 23, made of the same resin material as the base member 21 and the cover member 22, is provided.

The retaining rectifying member 23 extends over the entire area between the other end surface 25d of the flame arrester 25 and the radial stepped surface 31b in the radial direction of the recessed body portion 31, to have a sufficient length in the axial direction to retain the flame arrester 25 with respect to the fitting holding portion 32.

Figure 9:
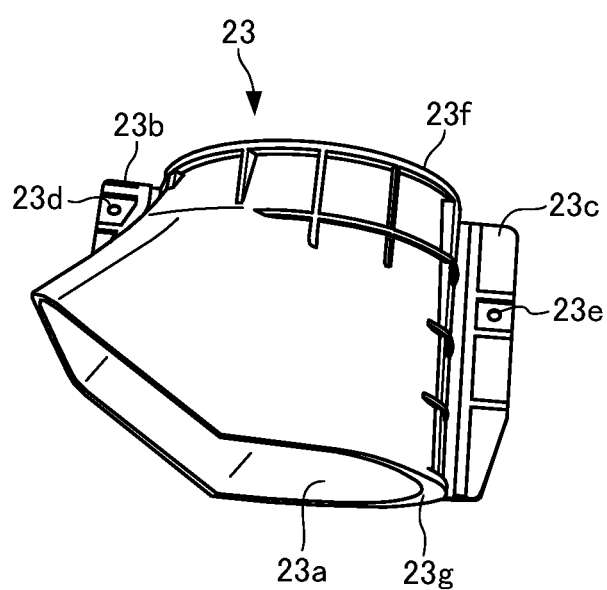
FIG. 9 is a perspective view of a retaining rectifying member of an intake manifold according to an embodiment of the present invention.

Further, as shown in FIG. 9, the retaining rectifying member 23 is formed in a tubular shape having an inner diameter and an outer diameter larger at the downstream end side than at the upstream end side. The inner peripheral surface 23a of the retaining rectifying member 23 forms a third inner wall surface continuous without a step from the opening on the other end side 25b of the flame arrester 25 to the second inner wall surface 31c of the recessed body portion 31. This means that the cylindrical retaining rectifying member 23 is provided among the flame arrester 25, base material 21 and the cover material 22, and the cylindrical retaining rectifying member 23 retains the flame arrester 25 with respect to the fitting holding portion 32 and has the inner peripheral surface 23a continuous without a step from an opening portion 25a on a downstream side of the flame suppression structure 26 to the inner wall surfaces 31c, 22c of the base member 21 and the cover member 22.

Further, the retaining rectifying member 23 has plate-shaped protruding portions 23b, 23c protruding radially outwardly of the intake passage 15 from the first inner wall surface 31a of the recessed body portion 31. These plate-shaped protruding portions 23b, 23c respectively have formed therein through holes 23d, 23e penetrating in the plate thickness direction.

The retaining rectifying member 23 is also so formed that the wall thickness including the rib height at the right end side portion shown in FIG. 8 is larger than that at other portions.

Further, as shown in FIGS. 2 and 4, the upstream side end surface 23f of the retaining rectifying member 23 is substantially flat. On the other hand, the downstream side end surface 23g of the retaining rectifying member 23 and the arcuate radial stepped surface 31b on the base member 21 side respectively have a portion inclined with respect to the upstream side end surface 23f and a portion parallel with respect to the upstream side end surface 23f.

On the other hand, the base member 21 is provided with recesses 21d, 21e for accommodating the plate-like protruding portions 23b, 23c and fixing pins 21f, 21g protruding from the inner bottom wall surface side of the recesses 21d, 21e and penetrating the through holes 23d, 23e of the plate-like protruding portions 23b, 23c.

The elastic holder member 51 is made of an elastic material, prepared for rubber resilience, hardness, heat resistance, chemical resistance, etc. suitable for the use conditions of the flame arrester 25, for example, a blended elastic material by blending PVC (vinyl chloride) to a nitrile rubber (NBR) at a predetermined blending ratio.

Figure 6A:
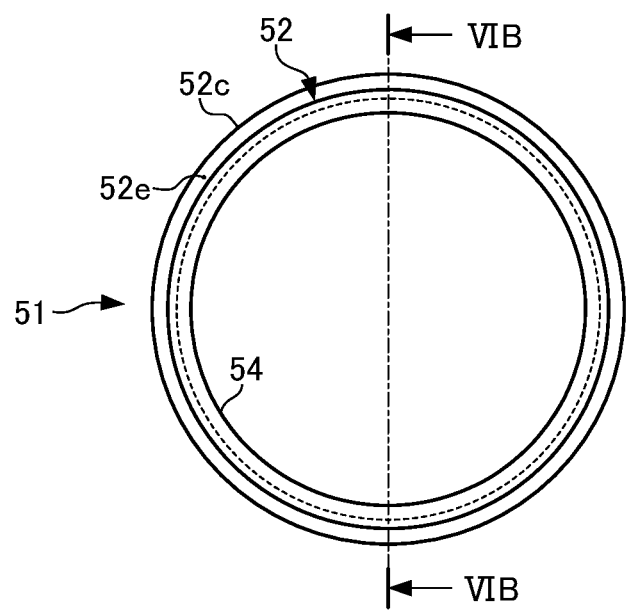
FIG. 6A is a front view of the abutting portion of the elastic holder member of the flame damper assembled on the base member of the intake manifold according to one embodiment of the present invention.
Figure 6B:
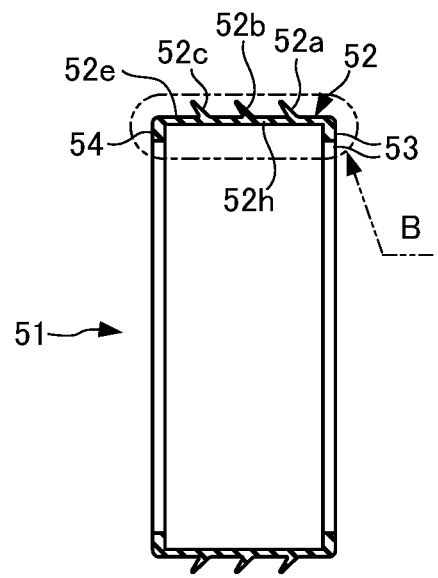
FIG. 6B is a sectional view taken along line VIB-VIB in FIG. 6A.
Figure 7:
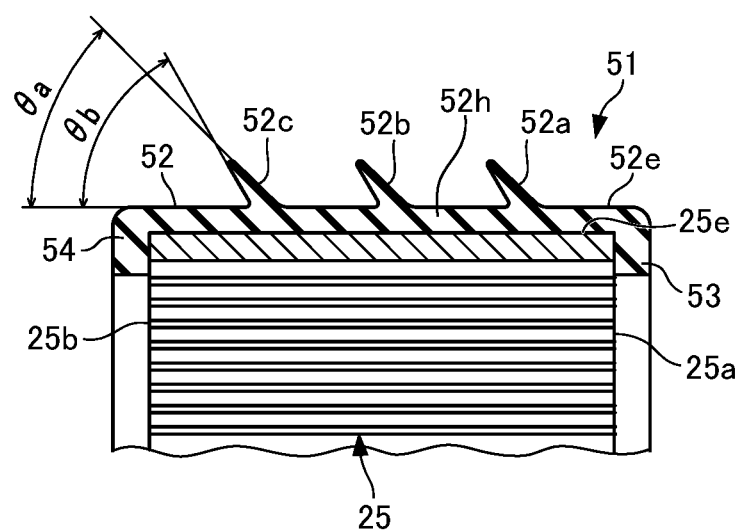
FIG. 7 is a partial enlarged view showing part B in FIG. 6B with a part of the flame suppression structure.

As shown in FIGS. 6A, 6B and 7, the elastic holder member 51 includes an outer peripheral fitting portion 52 fitted to the fitting holding portion 32 while closely contacting the outer peripheral surface 25e of the flame arrester 25.

The outer peripheral fitting portion 52 includes a cylindrical wall portion 52h held in close contact with the outer peripheral surface 25e of the outer cylindrical body 27 and a plurality of, for example, three annular seal lips 52a, 52b, 52c (lip portion) respectively protruding from the outer peripheral surface 52e of the cylindrical wall portion 52h. The seal lips 52a, 52b, 52c respectively protrude in the radially outside and axially one side of the outer fitting portion 52 to be spaced apart from each other by a predetermined distance in the axial direction.

The plurality of the seal lips 52a, 52b, 52c respectively have a tapered lip shape inclined with respect to the central axis line and the outer peripheral surface 25e of the flame arrester 25, so that the inclination angle θa is formed on the outer peripheral surface side thereof and the inclination angle θb is formed on the inner peripheral surface side thereof.

The inclination angle θa on the outer peripheral surface side is, for example, 45 degrees and the inclination angle θb on the inner peripheral surface side is, for example, 60 degrees. Therefore, since the inclination angle θa of the outer peripheral surface side is set to be smaller than the inclination angle θb of the inner peripheral surface side, the seal lips 52a, 52b, 52c respectively become thinner as the radius increases, so that the seal lips 52a, 52b, 52c are formed in an easily bent lip shape.

The seal lips 52a, 52b, 52c respectively protrude in the radially outside and axially one side of the outer fitting portion 52 to be spaced apart from each other by a predetermined distance in the axial direction. Therefore, when the elastic holder 51 is integrally attached to the flame arrester 25 and fitted into the fitting holding portion 32, the plurality of seal lips 52a, 52b, 52c are respectively fitted into the fitting holing portion 32 from the other side in the axial direction in which they are tapered.

Further, the outer diameters of the seal lips 52a, 52b, 52c in a free form are larger than the inner diameter of the fit inner peripheral wall surface 32b of the fitting holding portion 32, while the outer diameter of the outer peripheral surface 52e of the cylindrical wall portion 52h held in close contact with the outer cylindrical body 27 of the flame arrester 25 is smaller than the inner diameter of the fit inner peripheral wall surface 32b of the fitting holding portion 32.

Therefore, when the elastic holder member 51 is integrally disposed with the flame arrester 25 and fitted into the fitting holding portion 32, the outer peripheral side portions of the seal lips 52a, 52b, 52c are respectively brought into airtight contact with the fitting inner peripheral wall surface 32b of the fitting holding portion 32 with a predetermined contact surface pressure and a predetermined contact width. On the other hand, at the time of this fitting, there is formed a small gap between the outer peripheral surface 52e of the cylindrical wall portion 52h and the fitting inner peripheral wall surface 32b of the fitting holding portion 32

In addition, the elastic holder member 51 has an abutting portion on one side 53 and an abutting portion on the other side 54 arranged integrally with the outer peripheral fitting portion 52 therein.

The abutting portion on one side 53 is arranged to be abutted to engage with the annular plate-shaped abutment surface 32a of the fitting holding portion 32, while surrounding an opening on one end side 25a of the flame arrester 25 that constitutes an upstream end side opening of the flame suppression structure 26. The abutting portion on the other side 54a is arranged to be pressed in a retaining direction by the retaining rectifying member 23, while surrounding an opening on the other end side 25b of the flame arrester 25 that constitutes a downstream end side opening of the flame suppression structure 26.

On the other hand, as shown in FIG. 3, the cover member 22 has a cover side first inner wall surface 22a and a cover side second inner wall surface 22c. The cover side first inner wall surface 22a having a substantially semicircular transverse cross section is disposed at a position continuing to the fitting inner peripheral wall surface 32b of the fitting holding portion 32 of the base member 21, while the cover side second inner wall surface 22c is connected to the cover side first inner wall surface 22a through a cover side stepped surface 22b in the radial direction.

Further, the retaining rectifying member 23 is disposed between the other end of the flame arrester 25 held by the fitting holding portion 32 and the cover side stepped surface 22b as well, so that the retaining rectifying member 23 prevents the flame arrester 25 from coming off with respect to the fitting holding member 23, through the cover member 22 fixed to the base member 21 by means of welding or the like. Further, the upper half of the inner peripheral surface 23a of the retaining rectifying member 23 forms a third inner wall surface that extends from the opening on the other end side 25b of the flame arrester 25 to the cover side second inner wall surface 22c of the cover member 22.

It can be understood from the foregoing that the third inner wall surface of the base member 21 and the cover side third inner wall surface are integrally formed by the inner peripheral surface 23a of the retaining rectifying member 23, so that an inner wall surface of the intake passage 15 continuous with no step is formed from the opening on the other end side 25b of the flame arrester 25 to the second inner wall surface 31c of the base member 21 and the cover side second inner wall surface 22 c of the cover member 22.

Here, the relationship between the first inner wall surface 31a and the second inner wall surface 31c of the semicircular cross section steppedly connected to the first inner wall surface 31a through the radial stepped surface 31b will be described.

While an upper end of the recessed body portion 31 is opened, the annular fitting holding portion 32 has a shape in which the flame arrester 25 is fitted into the recessed body portion 31 so as to be capable of abutting in the axial direction. This means that, while the recessed body portion 31 can be molded by a simple molding die with the vertical direction in FIG. 2 as the mold opening/closing direction, the annular fitting holding portion 32 is formed such that the recessed body portion 31 is formed in the molding die using a slide core that moves in the left/right direction is required.

Moreover, the inner diameter of the annular fitting holding portion 32 is small on the outer end side (the upstream end side of the base member 21) having the abutment surface 32a, and becomes larger on the inner end side where the fitting inner peripheral wall surface 32b is formed. Therefore, when demolding the molded base member 21, it is necessary to slide a slide core toward the side of the recessed body portion 31.

For this reason, the recessed body portion 31 has formed therein the first inner wall surface 31a of a semicircular cross section having the same radius and continuous to the lower portion of the fitting inner peripheral wall surface 32b of the fitting holding portion 32. The arcuate radial stepped surface 31b is formed between the first inner wall surface 31a and the second inner wall surface 31c which is the inner peripheral wall surface forming the intake passage 15.

Next, the operation will be described.

In the intake manifold 10 of the present embodiment constructed as described above, when the flame arrester 25 is fitted into the fitting holding portion 32 of the base member 21 so as to abut against the fitting holding portion 32 in the axial direction, the flame arrester 25 is concentrically held in the fitting holding portion 32.

In this fitting work, the outer peripheral fitting portion 52 of the elastic holder member 51 is fitted in the fitting holding portion 32, while being held in close contact with the outer peripheral surface 25e of the flame arrester 25. On the outer peripheral side portions of the seal lips 52a, 52b, 52c which are larger than the inner diameter of the fitting inner peripheral wall surface 32b, the outer peripheral fitting portion 52 is brought into airtight contact with the fitting inner peripheral wall surface 32b of the fitting holding portion 32 respectively with a predetermined contact surface pressure and a predetermined contact width.

In the present embodiment, since the outer diameter of the outer peripheral surface 52e of the cylindrical wall portion 52h of the outer peripheral fitting portion 52 is smaller than the inner diameter of the fitting inner peripheral wall surface 32b of the fitting holding portion 32, the pressing force for pushing the flame arrester 25 integrally fitted with the elastic holder member 51 so as to fit in the fitting and holding portion 32 is limited to such a degree that the outer peripheral side portions of the seal lips 52a, 52b, 52c are deflected by a predetermined amount, thereby improving the assembling workability of the flame arrester 25 to the base member 21.

Further, the outer diameters of the plurality of seal lips 52a, 52b, 52c are reduced on the other axial side which becomes the distal end side when fitted into the fitting holding portion 32, thereby improving the workability of incorporating the flame arrester 25 to the base member 21.

In the present embodiment, after the flame arrester 25 having the elastic holder member 51 attached thereto is fitted into the fitting and holding portion 32, the retaining rectifying member 23 is incorporated between the flame arrester 25 and the radial stepped surface 31b in the radial direction of the recessed body portion 31 of the base member 21.

At this time, the flame arrester 25 is pushed further into the fitting holding portion 32 by the retaining rectifying member 23, so that the assembling fitting attitude of the flame arrester 25 is corrected coaxially with respect to the fitting holding portion 32 and the flame arrester 25 is retained with respect to the fitting holding portion 32.

Further, the inner peripheral surface 23a of the retaining rectifying member 23 forms a third inner wall surface continuous from the opening on the other end side 25b of the flame arrester 25 to the second inner wall surface 31c of the recessed body portion 31 without a step, so that a step can be eliminated in the inner wall surface of the intake passage 15 in the downstream side of the flame arrester 25, thereby allowing an optimum passage shape to be easily and precisely formed.

In the present embodiment, the plurality of seal lips 52a, 52b, 52c respectively have a tapered lip shape in which the wall thickness decreases as the radius increases so that the plurality of seal lips 52a, 52b, 52c are easily bent, and are arranged to be equally spaced apart in the axial direction. Therefore, the plurality of seal lips 52a, 52b, 52c can elastically support the flame arrester 25 at a predetermined position in the fitting holding portion 32 with appropriate damper characteristics.

In addition, since the flame arrester 25, having the elastic holder member 51 mounted therein, is fitted into the annular fitting holding portion 32, the flame arrester 25 can be attached to the base member 21 while sufficiently securing airtightness around the flame arrester 25, thereby making it unnecessary to use a holding plate or the like for fixing the flame arrester 25 to the base member 21. Since the flame arrester 25 is held by the annular fitting holding portion 32, the welded joint portion of the base member 21 and the cover member 22 does not receive the weight or inertial force of the flame arrester 25, thereby making it possible to narrow the welded joint portion between the base member 21 and the cover member 22.

As a result, the intake manifold 10 does not have a large diameter at an accommodating portion of the flame arrester 25, while sufficiently securing the holding strength of the flame arrester 25, the coupling strength of the base member 21 and the cover member 22, thereby making it possible to effectively suppress the mounting size and the mounting height.

Further, in the present embodiment, it is possible to stably hold the abutment attitude of the retaining rectifying member 23 against the flame arrester 25 in the contacting posture between the base member 21 and the plate-like protruding portions 23b, 23c, and also the assembling posture of the flame arrester 25 on the base member 21 can be further stabilized.

Furthermore, in the present embodiment, since the elastic holder member 51 is integrally attached to the flame arrester 25, both the flame arrester 25 and the retaining rectifying member 23 can be assembled to the base member 21 without rattling.

In addition, in the present embodiment, the inner peripheral surface 23a of the retaining rectifying member 23 is formed as a cover side third inner wall surface continuing without steps, as well as between the opening 25b on the other end side of the flame arrester 25 and the cover-side second inner wall surface 22c of the cover member 22. Therefore, formation of a step can be reliably prevented throughout the entire inner peripheral surface of the intake passage 15, by providing the second inner wall surface 31c of the base member 21, the cover side second inner wall surface 22c of the cover member 22, and the inner peripheral surface 23a of the retaining rectifying member 23. Therefore, the intake air pressure through the intake passage 15 can be suppressed, thereby making it possible to contribute to the improvement of engine output and reduction of fuel consumption.

Further, in the present embodiment, the downstream side end surface 23g of the retaining rectifying member 23 and the radial step surface 31b on the side of the base member 21 have inclined portions with respect to the upstream side end surface 23f, respectively. Therefore, when the retaining rectifying member 23 is fitted between the flame arrester 25 and the step surface 31b of the base member 21, the retaining rectifying member 23 receives a reaction force from the elastic holder member 51 while being urged to one specific side in the axial direction. As a result, the retaining rectifying member 23 is positioned and held at a fixed position in the radial direction without rattle, thereby improving the precision of the assembling position of the retaining rectifying member 23, the abutting attitude to the flame arrester 25, the fixed attitude with respect to the base member 21, and the like.

As can be understood from the foregoing, in the present embodiment, it is possible to provide an easily compactable intake manifold 10 which makes it possible to easily fit the flame arrester 25 to a fixed position in the fitting holding portion 32 of the base member 21 while reliably fitting and holing the flame arrester 25 to the fitting holding portion 32.

When the intake manifold 10 is mounted, the throttle body is bolted to the upstream side portion 11a of the main pipe portion 11, and the joint portion thereof is sealed by the seal ring 17. When an engine having the intake manifold 10 disposed thereon is operated, air is introduced into the intake manifold 10 through the flame arrester 25 according to the intake operation of the engine. Fuel is injected from the injector into the intake air on the downstream side of the throttle valve in the throttle body to form an air-fuel mixture, which in turn is burnt in the combustion chamber in the engine.

Since the engine of the present embodiment is mounted on a PWC such as a water bike or an outboard motor or the like, there is a possibility that backfire may occur at the time of operation. To be more specific, in case the fuel in the combustion chamber is lean or water is sucked in and ignition failure or the like occurs, the combustion in the combustion chamber does not normally end in the explosion stroke. Therefore, when the intake valve opens next time, such a phenomenon may occur in which even the air-fuel mixture in the intake manifold 10 is ignited. However, in the upstream side of the intake passage 15 in the intake manifold 10, when the flame due to backfire reaches the flame arrester 25, the flame is blocked by the flame arrester 25. Therefore, propagations of the flame due to backfire to the upstream side of the intake manifold 10 are reliably suppressed, and damages to the intake system parts, the sensors, and the like are reliably prevented.

In the above-described embodiment, the base member 21 and the cover member 22 are joined by welding, but it goes without saying that any other joining method can be adopted.

Although a plurality of annular seal lips 52a, 52b, 52c are provided on the outer peripheral fitting portion 52 of the elastic holder member 51, vertical ribs or the like protruding and equally spaced apart in the peripheral direction may also be additionally disposed outside of the outer fitting portion 52 at a lower height than the annular seal lips 52a, 52b, 52c.

Furthermore, in the present embodiment, the flame arrester 25 is formed in a short cylindrical shape, but the shape thereof may be arbitrary. It may otherwise be a polygonal prism shape or both end surfaces thereof may not be parallel. Both end surfaces of the flame arrester 25 may not be flat or may be inclined with respect to the intake direction.

Still further, although the flame arrester 25 has a corrugated flame suppressing structure, it is needless to say that the flame arrester 25 can have an arbitrary flame suppressing structure other than a wire mesh type.

It goes without saying that the intake manifold of the present invention can also be applied to engines other than marine engines used for PWC, outboard motors and the like.

As described above, according to the present invention, it is possible to provide an easily compactable intake manifold which makes it possible to easily fit the flame damper to a fixed position in the fitting holding portion of the base member while reliably fitting and holing the flame damper to the fitting holding portion. The present invention is generally useful for all the intake manifolds in which a flame damper is incorporated on an intake passage.

EXPLANATION OF REFERENCE NUMERALS 10 intake manifold
11 main pipe section
11a upstream portion
12, 13, 14 branch pipe section
15 intake passage
21 base member
21d, 21e recess
21f, 21g pin
21r, 22r flange-like joint portion
22 cover member
22a cover side first inner wall surface
22b cover side stepped surface
22c cover side second inner wall surface
22h injector attachment hole portion
23 rectifying member
23a inner peripheral surface
23b, 23c plate-like protruding portion
23d, 23e through hole
23f upstream end surface
23g downstream end surface
25 flame arrester (flame damper)
25a opening portion
25b opening portion
26 flame suppression structure
27 outer cylindrical body
27b, 27c both end surfaces
31 recessed body portion
31a first inner wall surface
31b stepped surface
31c second inner wall surface
32 fitting holding portion
32a abutment surface
32b fitting inner peripheral wall surface
51 elastic holder member
52 outer peripheral fitting portion
52a, 52b, 52c seal lip
52e outer peripheral surface
52h cylindrical wall portion
53 abutting portion on one side
54 abutting portion on the other side
θa inclination angle
θb inclination angle

The invention claimed is:

1. An intake manifold, comprising:
a base member and a cover member, respectively made of resin and extending along an intake passage, the base member and the cover member facing each other in the radical direction of the intake passage; and
a flame damper having a flame suppression structure, the flame damper incorporated in a one end side portion of the base member so as to be positioned on the intake passage, wherein
the one end side of the base member includes a recessed body portion having a substantially split cylindrical shape and a fitting holding portion integrally formed with the recessed body portion to hold the flame damper by fitting the flame damper in the axial direction so as to be able to abut against the fitting holding portion,
the fitting holding portion includes an abutment surface against which the flame damper is able to abut from the side of the recessed body portion, and a fitting inner peripheral wall surface that surrounds and fits the flame damper therein,
the flame damper is constituted by the flame suppression structure, an outer cylindrical body that surrounds the outer periphery of the flame suppression structure and an elastic holder member that covers an outer peripheral surface and both end surfaces of the outer cylindrical body,
the elastic holder member includes an outer peripheral fitting portion held in close contact with the outer peripheral surface of the outer cylindrical body and fitted to the fitting holding portion, and the outer peripheral fitting portion includes a cylindrical wall portion held in close contact with the outer peripheral surface of the outer cylindrical body, and a plurality of annular lip portions respectively protruding from an outer peripheral surface of the cylindrical wall portion to the outside in the radial direction and one side in the axial direction of the cylindrical wall portion while being spaced apart from each other in the axial direction, and wherein the elastic holder member has an abutment portion on one side and an abutment portion on the other side integrally provided with the outer peripheral fitting portion, wherein the abutment portion on one side is abutting and engaging with the abutment surface having an annular plate-shape of the fitting holding potion while surrounding an opening on an end side of the flame suppression structure, and wherein the abutment portion on the other side is pressed in a retaining direction by a retaining and rectifying member while surrounding an opening on the other side of the flame suppression structure, and wherein the elastic holder member is made of a rubber material.

2. The intake manifold as set forth in claim 1, wherein the plurality of annular lip portions are set such that an inclination angle of an outer peripheral surface side with respect to the center axis line of the cylindrical wall portion is smaller than the inclination angle of an inner peripheral surface side.

3. The intake manifold as set forth in claim 1, wherein a cylindrical retaining rectifying member, which is interposed among the flame damper held by the fitting holding portion and the base member and the cover member, retains the flame damper with respect to the fitting holding portion and has an inner peripheral surface that continues without a step from an opening portion on the downstream side of the flame suppression structure to the inner wall surface of the base member and the cover member.

* * * * *